(12) United States Patent
Lee

(10) Patent No.: US 9,220,170 B2
(45) Date of Patent: Dec. 22, 2015

(54) MOTOR STARTER MODULE

(71) Applicant: LSIS CO., LTD., Anyang-si, Gyeonggi-do (KR)

(72) Inventor: Kyung Ku Lee, Cheongju-si (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 163 days.

(21) Appl. No.: 13/711,529

(22) Filed: Dec. 11, 2012

(65) Prior Publication Data

US 2013/0155628 A1    Jun. 20, 2013

(30) Foreign Application Priority Data

Dec. 14, 2011    (KR) .................. 10-2011-0134363

(51) Int. Cl.
*H05K 5/00* (2006.01)
*H02P 1/02* (2006.01)
*H01H 50/02* (2006.01)

(52) U.S. Cl.
CPC ............. *H05K 5/0017* (2013.01); *H02P 1/02* (2013.01); *H01H 50/021* (2013.01)

(58) Field of Classification Search
CPC ............................. H05K 5/0017; H05K 5/00
USPC .......................................... 361/736, 733, 732
See application file for complete search history.

(56) References Cited

U.S. PATENT DOCUMENTS 4,617,541 A * 10/1986 Chuang ...................... 335/133
5,652,420 A * 7/1997 Innes et al. ............... 200/50.32
6,531,940 B1 * 3/2003 Busch ......................... 335/132
6,856,503 B2 * 2/2005 Apfelbacher et al. ........ 361/676
2003/0109354 A1 * 6/2003 Imanishi et al. .............. 475/331

FOREIGN PATENT DOCUMENTS

| CN | 1369134 | 9/2002 |
|---|---|---|
| CN | 1178255 | 12/2004 |
| JP | 04-306526 | 10/1992 |
| JP | 2000-251600 | 9/2000 |
| JP | 2001286168 A * | 10/2001 |
| JP | 2003-508000 | 2/2003 |

OTHER PUBLICATIONS

Korean Intellectual Property Office Application Serial No. 10-2011-0134363, Office Action dated Jan. 10, 2013, 3 pages.
The State Intellectual Property Office of the People's Republic of China Application Serial No. 201210545712.2, Office Action dated Nov. 24, 2014, 6 pages.

* cited by examiner

*Primary Examiner* — Dion R Ferguson
*Assistant Examiner* — Mandeep Buttar
(74) *Attorney, Agent, or Firm* — Lee, Hong, Degerman, Kang & Waimey

(57) ABSTRACT

A motor starter module is provided, the module according to the present disclosure including a PCB (Printed Circuit Board) substrate configured to communicate with and control the magnetic contactor, a mechanism part operating in association with an operation of the magnetic contactor, and an upper case covering the PCB substrate and an outer case of the mechanism part, whereby the magnetic contactor can be locally and directly driven, and controlled via communication to reduce a line cost, to shorten an operation time and to promote maximization of spatial utilization.

4 Claims, 9 Drawing Sheets

MOTOR STARTER MODULE

CROSS-REFERENCE TO RELATED APPLICATIONS

Pursuant to 35 U.S.C. §119 (a), this application claims the benefit of earlier filing date and right of priority to Korean Patent Application No. 10-2011-0134363 filed on Dec. 14, 2011, the contents of which are hereby incorporated by reference in their entirety.

BACKGROUND OF THE DISCLOSURE

1. Field of the Disclosure

The present disclosure relates to a motor starter module, and more particularly to a motor starter module configured to reduce a line cost, to shorten an operation time and to promote maximization of space utilization by locally and directly driving a magnetic contactor and controlling the magnetic contactor via communication.

2. Discussion of the Related Art

Generally, a motor starter includes a manual motor starter (MMS) and a magnetic contactor (MC). In general, the motor protection circuit breaker, so-called a 'manual motor starter' (so called MMS as abbreviated), a device used for an electric line of rated insulation voltage of less than AC 690V (frequency 50 Hz or 60 Hz) and DC 250V, serves as a switching device which has a function for protecting a system and a load device such as a motor by automatically interrupting power supply to the system upon generation of a fault current in a section for starting or stopping the system or the motor, such as an electric shortage, an over-current, an open phase, an instantaneous current, a ground fault and an electric phase deficiency.

The magnetic contactor that attaches a contactor to close a contact point by flowing current to electromagnet is enable to open and close a load current.

FIG. 1 is a schematic view illustrating a system operated by a motor starter according to prior art. The system operated by the conventional motor starter includes a PLC (Programmable Logic Control, 10), an Input/Output (I/O) terminal (20), a terminal (30) and a plurality of motor starters.

The PLC (10) and the I/O terminal (20) are used to control ON/OFF of a magnetic contactor involved in a motor operation. That is, the PLC (10), the I/O terminal (20), and the terminal (30) are required to control the magnetic contactor. In order for the I/O terminal (20) of the PLC (10) to control the ON/OFF of the magnetic contactor, the PLC (10) must periodically learn the status of the magnetic contactor, and the PLC (10), upon check of the status of the magnetic contactor, controls an auxiliary relay connected to the I/O terminal (20) whereby the ON/OFF of the magnetic contactor can be controlled.

Thus, in a case there occurs a defect on the PLC (10) failing to monitor the status of the magnetic contactor, the control of ON/OFF of the magnetic contactor becomes disabled to cause a fatal damage to the system.

Furthermore, in a case a conventional motor starter is used, an auxiliary relay or an I/O terminal is separately required for additional functions, and an additional material or a wiring work is required to increase a manufacturing cost and to create a spatial restriction. Naturally, this results in additional costs over time.

SUMMARY OF THE DISCLOSURE

Exemplary aspects of the present disclosure are to substantially solve at least the above problems and/or disadvantages and to provide at least the advantages below. Accordingly, an aspect of the present disclosure provides a motor starter module configured to solve a spatial restriction and cost increase free from an additional material or a wiring work.

In one general aspect of the present disclosure, there is provided a motor starter module mounted at an upper surface of a magnetic contactor, the motor starter module comprising: a PCB (Printed Circuit Board) substrate configured to communicate with and control the magnetic contactor; a mechanism part operating in association with an operation of the magnetic contactor; and an upper case covering the PCB substrate and an outer case of the mechanism part.

In some exemplary embodiments, the mechanism part may include a movable contact point unit physically interlocking with the operation of the magnetic contactor; and a fixed contact point unit transmitting an electric signal by physically connecting the PCB substrate and the magnetic contactor.

In some exemplary embodiments, the motor starter module may further comprise: a movable contact point case fixing the movable contact point unit and physically connecting the motor starter module with the magnetic contactor; and a fixed contact point case fixing the fixed contact point unit and physically coupling the upper case.

In some exemplary embodiments, the upper case may include at least one groove for coupling the fixed contact point case, wherein the fixed contact point case may include at least one hook part for physically coupling the upper case.

In some exemplary embodiments, the movable contact point unit may include a movable contact point spring, a movable contact point arm, and a back spring, and the mechanism part operates in association with ON/OFF operation of the magnetic contactor by allowing the movable contact point arm to maintain a contact with a the fixed contact point arm when the magnetic contactor is in an OFF state, and by allowing the movable contact point arm to lose contact with the fixed contact point arm when the magnetic contactor is in an ON state.

In some exemplary embodiments, the fixed contact point may include a fixed contact point arm and a screw, wherein the screw connects the fixed contact point arm with the PCB substrate via a wire, transmits an electric signal to the PCB substrate when ON/OFF operation of the magnetic contactor occurs, and wherein the PCB substrate controls the magnetic contactor based on the electric signal transmitted by the fixed contact point.

The motor starter module thus configured according to the present disclosure has an advantageous effect in that a spatial restriction and cost increase can be solved free from an additional material or a wiring work. That is, the magnetic contactor can be locally and directly driven, and controlled via communication to reduce a line cost, to shorten an operation time and to promote maximization of spatial utilization.

BRIEF DESCRIPTION OF THE DRAWINGS

The above and other features of the present invention will now be described in detail with reference to certain exemplary embodiments thereof illustrated in the accompanying drawings which are given hereinafter by way of illustration only, and thus are not limitative of the present invention, and wherein.

DETAILED DESCRIPTION

Figure 1:
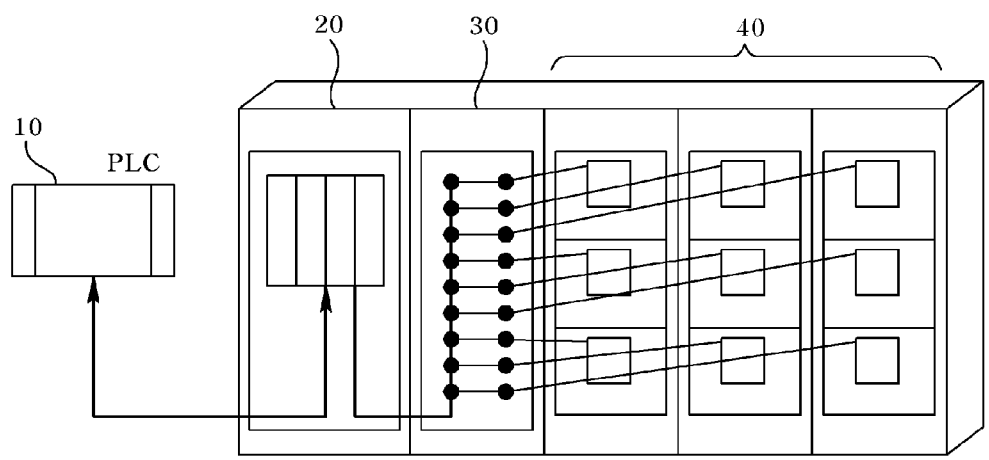
FIG. 1 is a schematic view illustrating a system operated by a motor starter according to prior art.

Hereinafter, exemplary embodiments of the present disclosure will be described in detail with reference to the accompanying drawings.

In describing the present disclosure, detailed descriptions of constructions or processes known in the art may be omitted to avoid obscuring appreciation of the invention by a person of ordinary skill in the art with unnecessary detail regarding such known constructions and functions. Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

The suffixes 'module', 'unit' and 'part' may be used for elements in order to facilitate the disclosure. Significant meanings or roles may not be given to the suffixes themselves and it is understood that the 'module', 'unit' and 'part' may be used together or interchangeably. That is, the terms "-er", "-or", "part" and "module" described in the specification mean units for processing at least one function and operation and can be implemented by hardware components or software components, and combinations thereof.

As used herein, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. That is, in the drawings, the size and relative sizes of layers, regions and/or other elements may be exaggerated or reduced for clarity. Like numbers refer to like elements throughout and explanations that duplicate one another will be omitted.

It will be understood that, although the terms first, second, etc. may be used herein to describe various elements, these elements should not be limited by these terms. These terms are only used to distinguish one element from another. For example, a first region/layer could be termed a second region/layer, and, similarly, a second region/layer could be termed a first region/layer without departing from the teachings of the disclosure.

The terminology used herein is for the purpose of describing particular embodiments only and is not intended to be limiting of the general inventive concept. As used herein, the singular forms "a", "an" and "the" are intended to include the plural forms as well, unless the context clearly indicates otherwise.

It will be understood that when an element is referred to as being "connected" or "coupled" to another element, it can be directly connected or coupled to the other elements or intervening elements may be present. In contrast, when an element is referred to as being "directly connected" or "directly coupled" to another element, there are no intervening elements present.

Figure 2:
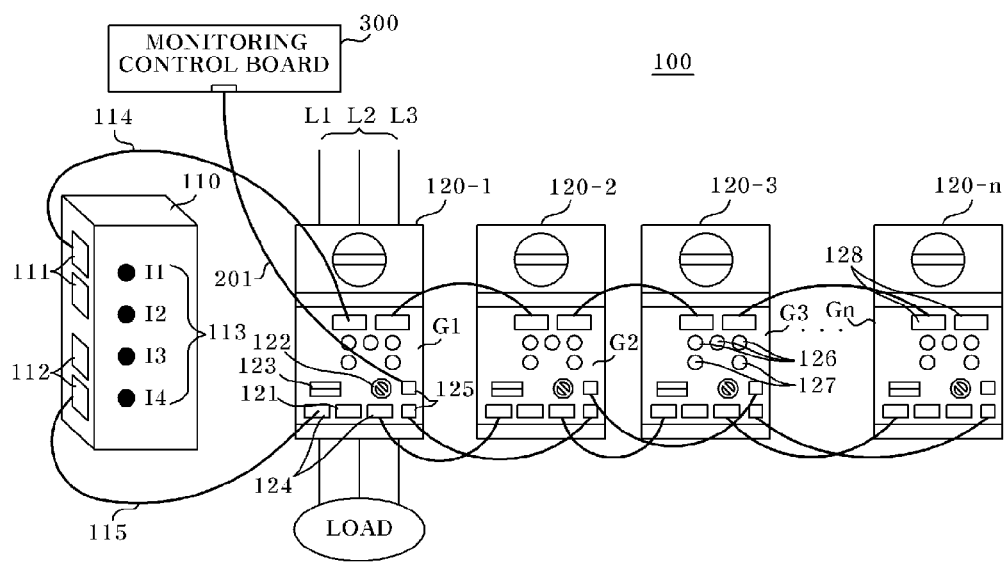
FIG. 2 is a schematic view illustrating a configuration of a system utilizing a motor starter module according to an exemplary embodiment of the present disclosure.

FIG. 2 is a schematic view illustrating a configuration of a system (100) utilizing a motor starter module according to an exemplary embodiment of the present disclosure. To be more specific, a plurality of motor starters (120-1, 120-2, 120-3 . . . 120-n) and a monitoring control board form a system. A power supply unit (110) is further included in addition to the plurality of motor starters (120-1, 120-2, 120-3 . . . 120-n).

The plurality of motor starters (120-1, 120-2, 120-3 . . . 120-n) includes communication modules (G1, G2, G3 . . . Gn), where the monitoring control board (300) monitors the status of the plurality of motor starters (120-1, 120-2, 120-3 . . . 120-n) using the communication modules (G1, G2, G3 . . . Gn).

The motor starter (120-1, 120-2, 120-3 . . . 120-n) is a device including a manual motor starter (MMS) and a magnetic contactor (MC), as explained above.

The MMS may be defined as a device used for an electric line of rated insulation voltage of less than AC 690V (frequency 50 Hz or 60 Hz) and DC 250V, serving as a switching device which has a function for protecting a system and a load device such as a motor by automatically interrupting power supply to the system upon generation of a fault current in a section for starting or stopping the system or the motor, such as an electric shortage, an over-current, an open phase, an instantaneous current, a ground fault and an electric phase deficiency.

The magnetic contactor that attaches a contactor to close a contact point by flowing current to electromagnet is enable to open and close a load current.

The monitoring control board (300) is connected to each motor starter (120-1, 120-2, 120-3 . . . 120-n) via a communication cable (201). The communication modules (G1, G2, G3 . . . Gn) are also connected among the motor starters (120-1, 120-2, 120-3 . . . 120-n) via the communication cable (201), where each of the motor starters (120-1, 120-2, 120-3 . . . 120-n) has a terminal (125) connecting the communication cable.

The communication modules (G1, G2, G3 . . . Gn) has a connection terminal (121) connected by a wired cable for controlling the magnetic contactor, and may further include a switch (122) for setting a communication ID (Identification) and a switch (123) for setting a communication speed.

Meanwhile, each of the motor starters (120-1, 120-2, 120-3 . . . 120-n) may further include a first display part for displaying ON/OFF of the magnetic contactor, displaying normalcy of the communication state, or displaying whether communication modules operate properly. Each of the motor starters (120-1, 120-2, 120-3 . . . 120-*n*) may further include a control switch (127) for turning on or off the magnetic contactor. The first display part may be realized by LED (Light Emitting Diode) or a 7-segment.

As noted above, each of the motor starters (120-1, 120-2, 120-3 . . . 120-*n*) and the monitoring control board (300) are wiredly connected, whereby the monitoring control board (300) can monitor the status of the magnetic contactor in real time from each of the motor starters (120-1, 120-2, 120-3 . . . 120-*n*) through the communication cable.

Now, a process of monitoring the status of the magnetic contactor formed on each of the motor starters (120-1, 120-2, 120-3 . . . 120-*n*) and relation thereof will be described later in detail.

Meanwhile, the system (100) mounted with the motor starter module has a power supply unit (110) for supplying an electric power to each of the motor starters (120-1, 120-2, 120-3 . . . 120-*n*), where the power supply unit (110) functions to operate an entire system (100) by supplying an operating power of 100V or 220V. The power supply unit (110) also functions to smoothly operate the motor starters (120-1, 120-2, 120-3 . . . 120-*n*) by supplying a DC 12V. The motor starters (120-1, 120-2, 120-3 . . . 120-*n*) have an input terminal (128) for receiving the DC 12V and an input terminal (128) for receiving the operating power of 100V or 220V.

The power supply unit (110) also has an output terminal (111) for supplying a DC 12V power and a output terminal (112) for supplying a DC 100/220V. The power supply unit (110) supplies the power by being connected to the motor starters (120-1, 120-2, 120-3 . . . 120-*n*) via connection cables (113, 115). The power supply unit (110) may further include a second display unit (113) for displaying status of power supplied to the motor starters (120-1, 120-2, 120-3 . . . 120-*n*), by which a user can check whether the power currently supplied to the motor starters (120-1, 120-2, 120-3 . . . 120-*n*) is normal to thereby prevent an operation fault or an accident from happening.

To be more specific, the second display unit (113) may include display means for displaying whether the supplied power is a low-voltage power, display means displaying whether the supplied power is 110V, display means for displaying whether the supplied power is 220V, and display means displaying whether the supplied power is an overvoltage. The display means may be realized by the LED. Meanwhile, each LED may display different colors to allow the user to instinctively learn the status of the supplied power.

The power supply unit (110) thus configured enables the user to promptly cope with an occurrence of emergency by supplying power to the motor starters (120-1, 120-2, 120-3 . . . 120-*n*) and notifying the status of supplied power.

Figure 3:
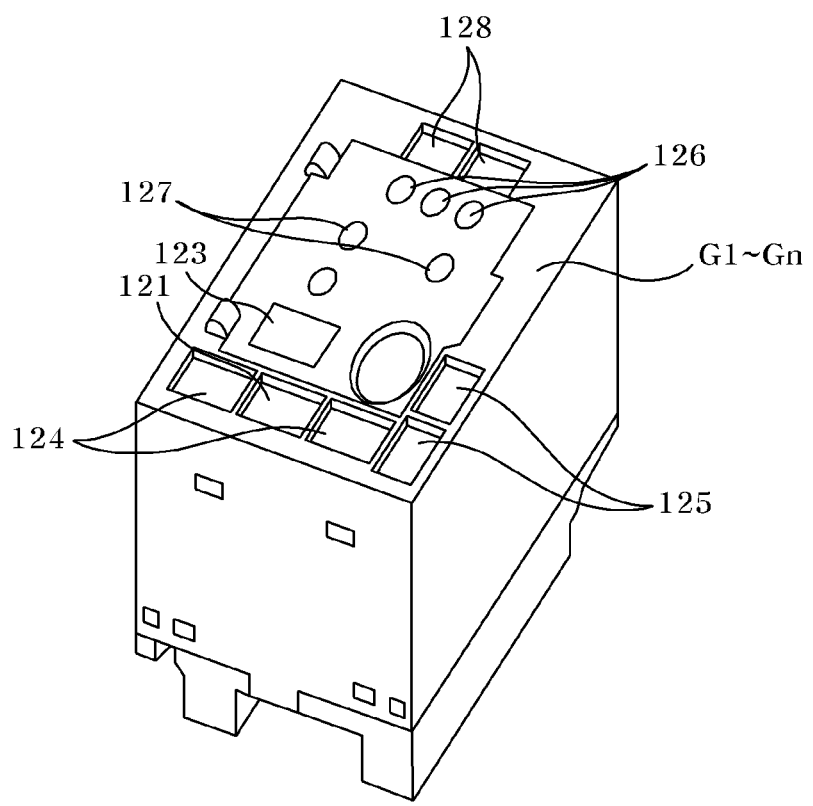
FIG. 3 is a schematic view illustrating an outer appearance of a motor starter module according to an exemplary embodiment of the present disclosure.

FIG. 3 is a schematic view illustrating an outer appearance of a motor starter module according to an exemplary embodiment of the present disclosure.

Reference numerals in FIG. 2 are used in FIG. 3 in the like manner. While a detailed configuration of the motor starter module according to an exemplary embodiment of the present disclosure will be described in the following description, an outer appearance of the motor starter module will be first described.

The motor starter module according to an exemplary embodiment of the present disclosure includes a communication module enabling communication with the monitoring control board (300) and other motor starters.

The communication module, as illustrated in FIG. 3, includes a connection terminal (121) connected by a wired cable for controlling the magnetic contactor, a switch (122) for setting the communication ID, a switch (123) for setting a communication speed, an input terminal (124) for receiving the 110/220V power, a terminal (125) for connecting the communication cables among the respective motor starters (120-1, 120-2, 120-3 . . . 120-*n*), a first display unit (126) displaying ON/OFF status of the magnetic contactor, normalcy/abnormality of the communication status and normalcy/abnormality of the communication module, a control switch (127) for turning on/off the magnetic contactor, and an input terminal (128) for receiving 12V power.

However, the communication modules (G1, G2, G3 . . . Gn) illustrated in FIG. 3 are only an exemplary embodiment of the present disclosure, and it should be apparent to the skilled in the art that other configurations are possible. Particularly, other configurations may be also possible as long as each terminal or each alignment of display means has the same functions as those in FIG. 3

The communication modules (G1, G2, G3 . . . Gn) illustrated in FIG. 3 have the above-mentioned effect, because the communication modules (G1, G2, G3 . . . Gn) illustrated in FIG. 3 provide real-time status information of the motor starter module to the monitoring control board (300) according to the present disclosure.

Figure 4:
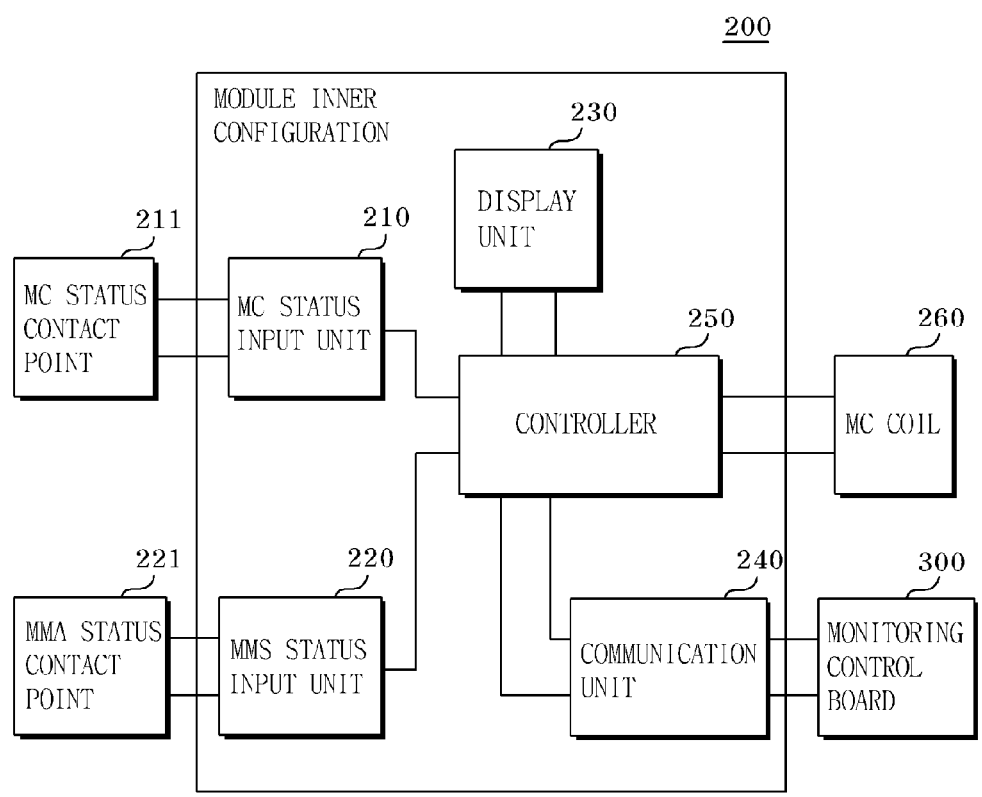
FIG. 4 is a block diagram illustrating a configuration of a motor starter module according to an exemplary embodiment of the present disclosure.

FIG. 4 is a block diagram illustrating a configuration of a motor starter module according to an exemplary embodiment of the present disclosure.

Referring to FIG. 4, a motor starter (200) includes an MC status input unit (210), an MMS status input unit (220), a display unit (230), a communication unit (240) and a controller (250).

The MC status input unit (210) functions to receive status information (hereinafter referred to as 'MC status information') from the magnetic contactor by being connected to the magnetic contactor via an MC status contact point (211). The MMS status input unit (220) functions to receive status information (hereinafter referred to as 'MMS status information') from MMS by being connected to the MMS via an MMS status contact point (221).

The display unit (230) functions to display ON/OFF of the magnetic contactor, normalcy/abnormality of the communication status and normalcy/abnormality of the communication modules. The communication unit (240) serves to transmit the MC status information inputted from the MC status input unit (210) and status information inputted from the MMS status input unit (220) to the monitoring control board (300). The communication unit (240) is wiredly connected to the monitoring control board (300) via a cable, and transmits status information to the monitoring control board (300) in response to the control of the controller (250, described later), if there is a request from the monitoring control board (300).

If a command to operate the magnetic contactor from the monitoring control board (300), the controller (250) reads the MC status information and the MMS status information. Then, if the current MC status information is OFF, and if the MMS status information is ON, that is, if the magnetic contactor is inoperative, and the MMS is in operation, the controller (250) transmits a control command to the magnetic contactor connected via an MC coil (260) and operates the magnetic contactor and to transmits a control completion command to the monitoring control board (300).

Meanwhile, if the MC status information is already ON, and the MMS status information is already OFF, when a command to turn on the magnetic contactor is received from the monitoring control board (300), the controller (250) does not output a control command and transmits an NAK message to the monitoring control board (300).

Furthermore, when a command to turn off the magnetic contactor is received from the monitoring control board (300), the controller (250) reads the MC status information and the MMS status information. If the MC status information is ON, and the MMS status information is OFF, the controller (250) normally performs the control command and transmits the control completion command to the monitoring control board (300).

Alternatively, when a command to turn off the magnetic contactor is received from the monitoring control board (300), the controller (250) reads the MC status information and the MMS status information. If the MC status information is OFF, and the MMS status information is ON, the controller (250) does not perform the control command and transmits an NAK message to the monitoring control board (300).

Meanwhile, the controller (250) may periodically receive the MMS status information to turn off the magnetic contactor connected to the MC coil (260), if the MMS status information is changed from ON (normal) to OFF (abnormal).

Base on the abovementioned configuration, the monitoring control board (300) monitors the MC status information and the MMS status information in real time to increase stability of the system by being in a position to control the magnetic contactor.

Figure 5:
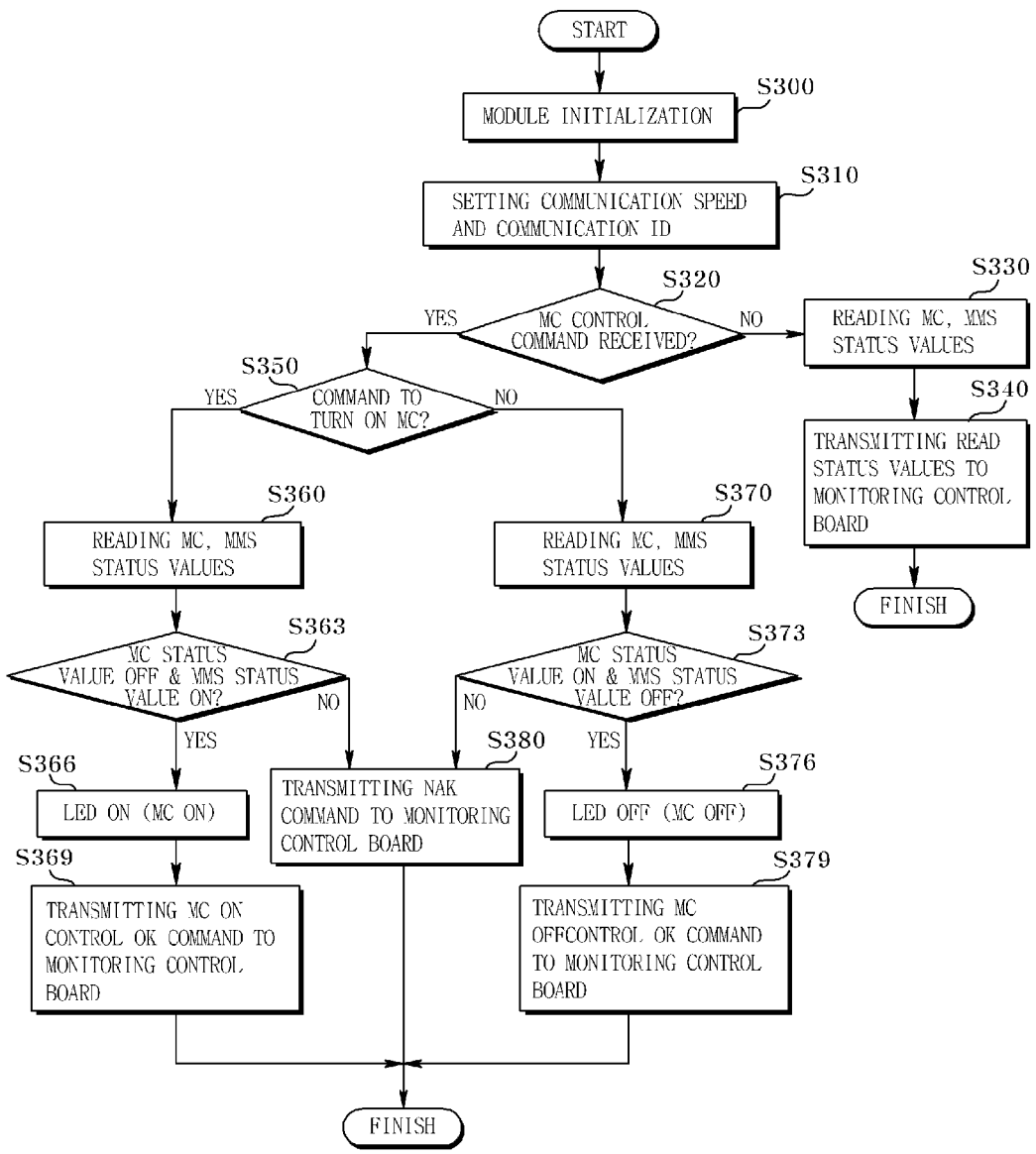
FIG. 5 is a flowchart illustrating an operation method of a motor starter module according to an exemplary embodiment of the present disclosure.

FIG. 5 is a flowchart illustrating an operation method of a motor starter module according to an exemplary embodiment of the present disclosure.

First, a module initialization (S300), a communication speed and a communication ID are set up (S310). Successively, determination is made as to whether a control command is received from the magnetic contactor (S320). If the control command is not received from the magnetic contactor (S320-No), status values of the magnetic contactor and the MMS are read (S330) and transmitted to the monitoring control board (300) (S340). The operation process may be performed by the MC status input unit and the MMS input unit.

If the control command is received from the magnetic contactor (S320-Yes), determination is made as to whether the command is a command to turn on the magnetic contactor, or a command to turn off the magnetic contactor (S350). If the command is a command to turn on the magnetic contactor (S350-Yes), status values of the magnetic contactor and the MMS are read (S360) to cause the magnetic contactor to be in a turned-on status and to turn on the LED, if the status value of the magnetic contactor is OFF, and the status value of the MMS is ON (S366). Furthermore, a magnetic contactor-ON control completion message is transmitted to the monitoring control board (300) (S369).

Meanwhile, if the command is a command to turn on the magnetic contactor, while the status value of the magnetic contactor is not OFF or the status value of the MMS is not ON (S363-No), an NAK message is transmitted to the monitoring control board (300) to notify that an error has occurred (S380).

Alternatively, if the command turning off the magnetic contactor is received, (S350-No), the status values of the magnetic contactor and the MMS are first read (S370), and if the status values of the magnetic contactor is ON and the MMS are first read is OFF (S363-Yes), the magnetic contactor is turned off and an LED indicating the operation status of the magnetic contactor is turned off (S376).

Furthermore, a message having turned off the magnetic contactor is transmitted to the monitoring control board (300). Alternatively, if the command is to turn off the magnetic contactor, while the magnetic contactor is not ON or status value of the MMS is not OFF (S373-No), an NAK message is transmitted to the monitoring control board (300) to notify that an error has occurred (S380).

By the abovementioned configuration, the monitoring control board (300) advantageously monitors the status of the magnetic contactor in real time to perform a stable control of the magnetic contactor and to solve the spatial restriction and/or the cost increase.

Figure 6:
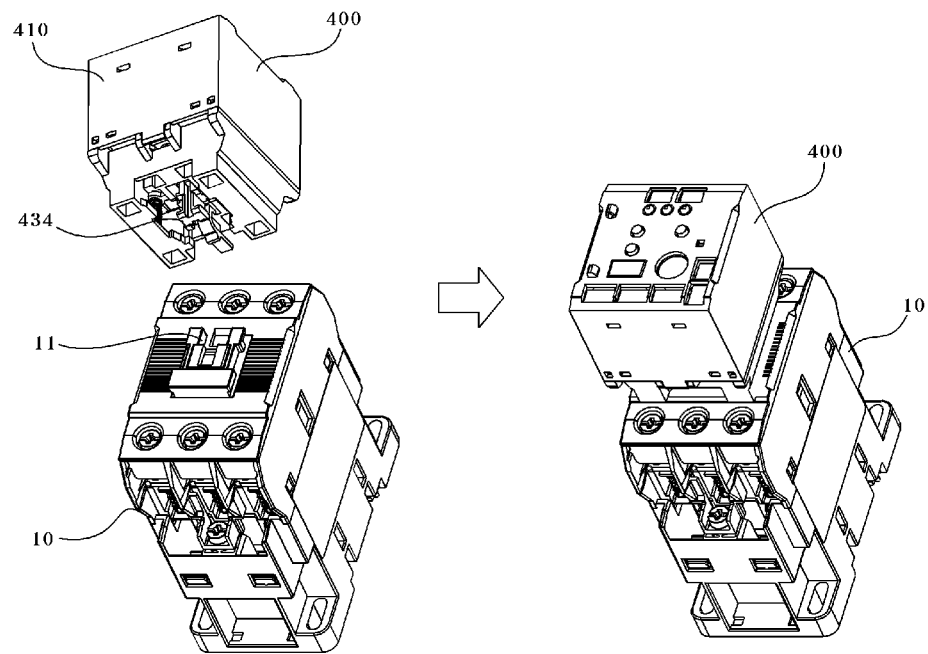
FIG. 6 is a schematic view illustrating an entire configuration of a motor starter module according to an exemplary embodiment of the present disclosure.

FIG. 6 is a schematic view illustrating an entire configuration of a motor starter module according to an exemplary embodiment of the present disclosure.

Although the motor starter module (400) according to the exemplary embodiment of the present disclosure is described with a reference numeral of 200 in FIGS. 3 and 4, the motor starter module of FIG. 6 is given with a reference numeral of 200 as in FIGS. 3 and 4. However, the reference numeral is changed to 400 in order to explain a mechanical configuration of the motor starter module.

Referring to FIG. 6, the motor starter module (400) according to the exemplary embodiment of the present disclosure may be changed design-wise to be attached on an upper surface of a magnetic contactor (10).

To be more specific, a coupling unit (434) mounted at a bottom end of a movable contact point case of the motor starter module (400) is inserted into a groove (11) mounted on an upper surface of a magnetic contactor (10). That is, as illustrated in the left side of FIG. 6, the motor starter module (400) is coupled to the magnetic contactor to an arrow direction, a result of which is illustrated in the right side of FIG. 6.

As noted above, the motor starter module (400) according to the exemplary embodiment of the present disclosure is formed at an upper surface of the magnetic contactor (10) to monitor and control the magnetic contactor (10).

Figure 7A:
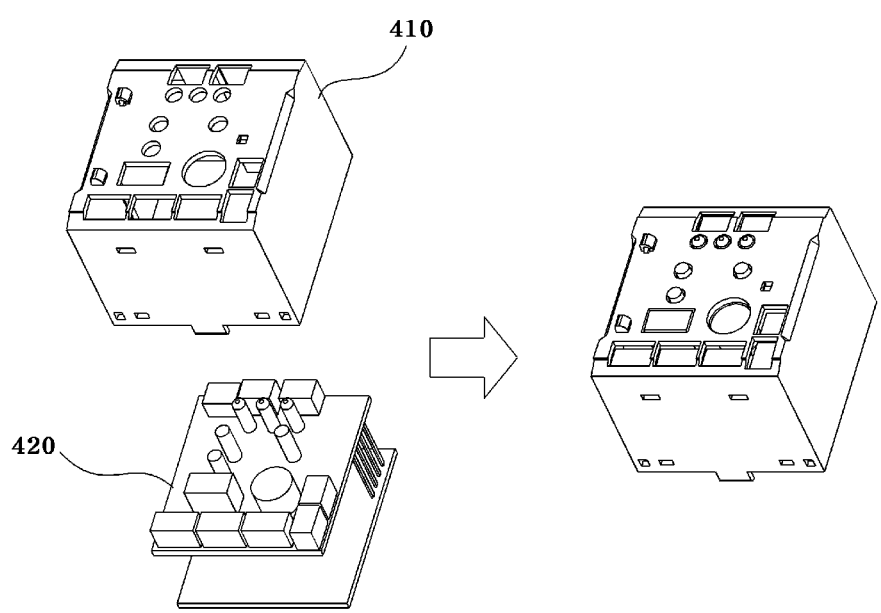
FIG. 7a is a schematic view illustrating a coupled relation between an upper case and a PCB substrate in a motor starter module according to an exemplary embodiment of the present disclosure.

FIGS. 7a is a schematic view illustrating a coupled relation between an upper case and a PCB substrate (420) in a motor starter module according to an exemplary embodiment of the present disclosure.

The PCB substrate (420) in FIG. 7a functions to communicate with or control the magnetic contactor (10). As shown in FIG. 7a, the PCB substrate (420) is assembled inside an upper case (410). That is, the upper case (410) is assembled in a shape of wrapping the PCB substrate (420), a result of which is shown in the right side of FIG. 7a.

Meanwhile, each constituent element of the PCB substrate (420) has been already described in FIG. 3 as reference numerals 121 and 128, such that no redundant explanation thereto will be provided hereinafter.

Figure 7B:
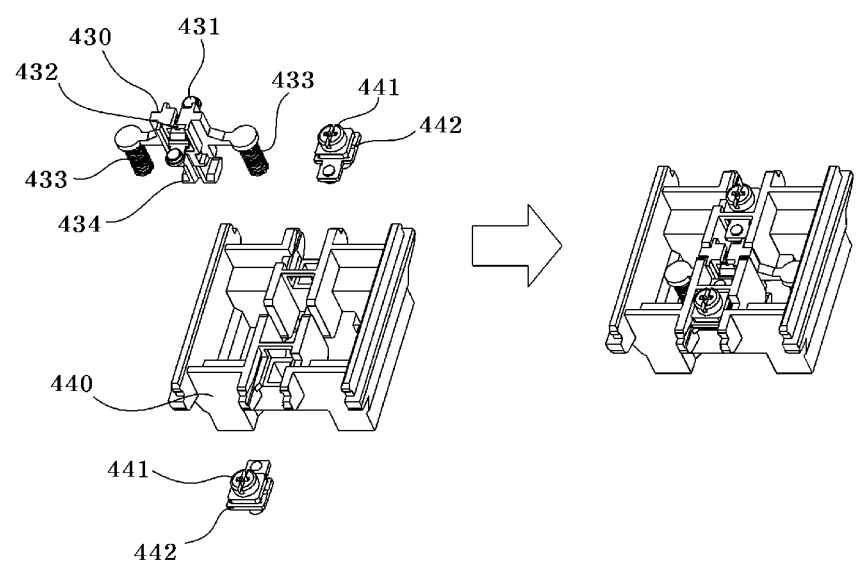
FIG. 7b is a schematic view illustrating a coupled relation between a movable contact point case and a fixed contact point case in a motor starter module according to an exemplary embodiment of the present disclosure.

FIG. 7b is a schematic view illustrating a coupled relation between a movable contact point case and a fixed contact point case that form the mechanism part in a motor starter module according to an exemplary embodiment of the present disclosure.

Referring to FIG. 7b, the mechanism part includes a movable contact point case (430), a fixed contact point case (440) and elements that form each case (430, 440). The movable contact point case (430) functions to fix a movable contact point arm (431), a movable contact point spring (432), and a back spring (433), where the movable contact point arm (431), the movable contact point spring (432), and the back spring (433) fixed by the movable contact point case (430) are collectively called a moving contact point unit.

To be more specific, the movable contact point arm (431) is assembled on the movable contact point spring (432), and the back spring (433) is assembled on an external wing of the movable contact point case (430). Furthermore, the movable contact point case (430) is coupled at a bottom surface of the movable contact point case (430) with a coupling unit (434) for coupling with the magnetic contactor (10), which forms a physical coupling by being connected to a groove (11) formed at an upper surface of the magnetic contactor (10).

Meanwhile, the fixed contact point case (440) includes a fixed contact point arm (442), and a screw (441) for fixing and connecting the fixed contact point arm (442) via a wire. The fixed contact point arm (442) and the screw (441) are collectively called a fixed contact point unit. Each one fixing contact point unit is formed at a left corner and a right corner of the fixed contact point case (440).

Figure 8:
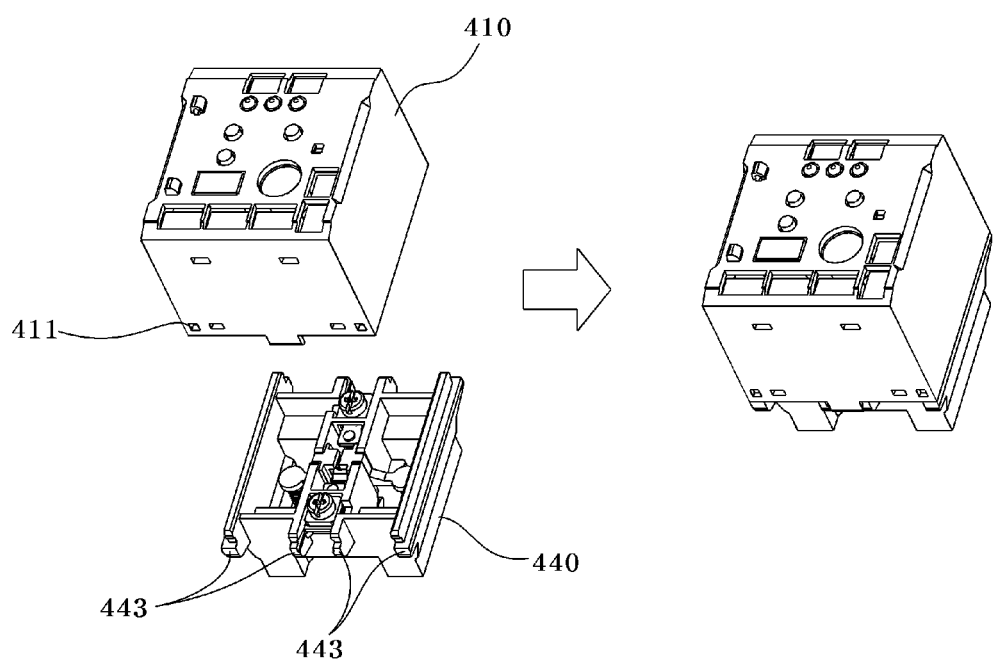
FIG. 8 is a schematic view illustrating a coupled relation between an upper case and a fixed contact point case in a motor starter module according to an exemplary embodiment of the present disclosure.

FIG. 8 is a schematic view illustrating a coupled relation between an upper case and a fixed contact point case in a motor starter module according to an exemplary embodiment of the present disclosure.

Referring to FIG. 8, the fixed contact point case (440) is formed with a hook part (443) for being physically coupled with a groove (411) formed on the upper case (410) to thereby form the motor starter module (400). Although FIG. 8 has illustrated four hook parts (443) and four grooves (411), the present disclosure is not limited thereto. It should be apparent that the hook parts (443) and grooves (411) with a few or greater than four may be mounted.

Figure 9:
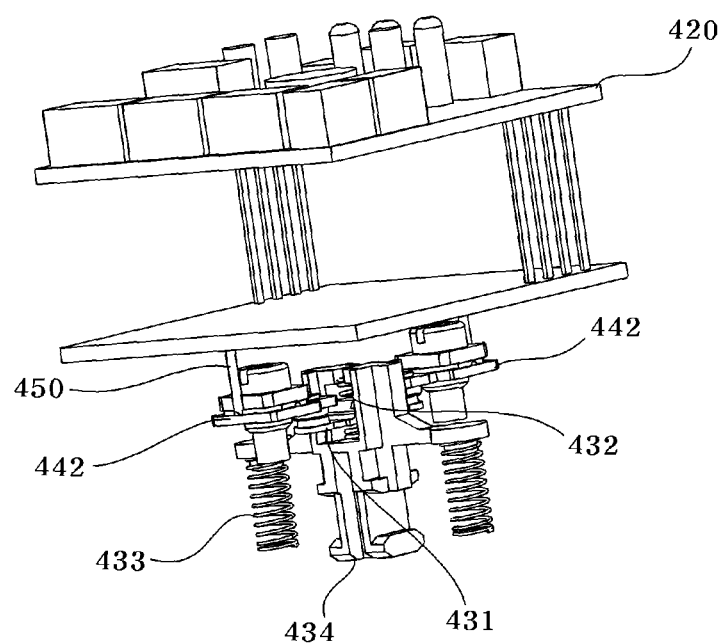
FIG. 9 is a schematic view illustrating a connected relation among a PCB substrate, a movable contact point and a fixed contact point in a motor starter module according to an exemplary embodiment of the present disclosure.

FIG. 9 is a schematic view illustrating a connected relation among a PCB substrate, a movable contact point and a fixed contact point in a motor starter module according to an exemplary embodiment of the present disclosure.

As explained above, the movable contact point unit includes a movable contact point arm (431), a movable contact point spring (432) and a back spring (433), where the fixed contact point unit includes a fixed contact point arm (442) and a screw (441). Meanwhile, the PCB substrate (420) and the fixed contact point arm (442) of the fixed contact point unit are connected via a wire (450), and the screw functions to fix the wire (450).

Now, operation of the motor starter module (400) will be described with reference to FIG. 9. If the magnetic contactor (10) is turned on/off, an operating unit of the magnetic contactor (10) vertically operates to allow the motor starter module (400) formed at an upper surface of the magnetic contactor (10) to operate the movable contact point unit including the movable contact point arm (431), the movable contact point spring (432), and the back spring (433), in association with the operation of the magnetic contactor (10). That is, the movable contact point arm (431), the movable contact point spring (432), and the back spring (433) are operated.

In a case the magnetic contactor (10) is in an OFF state, the movable contact point arm (431) on the mechanism part at the motor starter module (400) maintains a contact with the fixed contact point arm (442) due to load of the movable contact point spring (432) and the back spring (433).

Meanwhile, in a case the magnetic contactor (10) is in an ON state, the movable contact point unit moves downwards to make the movable contact point arm (431) distanced from the fixed contact point arm (442).

The fixed contact point arm (442) connected to the PCB substrate (420) via a wire (450) transmits an electric signal to the PCB substrate (420) in a case ON/OFF operation of the PCB substrate (420) is generated, where the PCB substrate (420) controls the magnetic contactor (10) using the transmitted electric signal.

As apparent from the foregoing, the motor starter module (400) according to the exemplary embodiments of the present disclosure may be directly coupled to the magnetic contactor (10) to control the magnetic contactor (10), because the motor starter module (400) according to the exemplary embodiments of the present disclosure is operated in association with the operation of the magnetic contactor (10). Particularly, the motor starter module (400) according to the exemplary embodiments of the present disclosure is advantageously coupled to an upper surface of the magnetic contactor (10) to save space, enabling to perform a local control, to promote maximization of spatial utilization and to reduce line cost, whereby an operation time can be shortened during configuration of a motor control system.

The above-mentioned power supply system and control method thereof according to the present disclosure may, however, be embodied in many different forms and should not be construed as limited to the embodiments set forth herein. Thus, it is intended that embodiments of the present disclosure may cover the modifications and variations of this disclosure provided they come within the scope of the appended claims and their equivalents.

While particular features or aspects may have been disclosed with respect to several embodiments, such features or aspects may be selectively combined with one or more other features and/or aspects of other embodiments as may be desired.

What is claimed is:

1. A motor starter module mounted on an upper surface of a magnetic contactor, the motor starter module comprising:
   a Printed Circuit Board (PCB) substrate configured to communicate with and control the magnetic contactor;
   a mechanism part operating according to an ON/OFF state of the magnetic contactor and physically connecting the PCB substrate to the magnetic contactor; and
   an upper case covering the PCB substrate and an outer case of the mechanism part,
   wherein the mechanism part includes:
   a movable contact point unit fixed in a movable contact point case and moving according to the ON/OFF state of the magnetic contactor, the movable contact point unit including a movable contact point arm, a movable contact point spring and a back spring; and
   a fixed contact point unit fixed in a fixed contact point case, physically connecting the PCB substrate to the magnetic contactor and transmitting an electric signal to the PCB substrate according to whether the fixed contact point unit is in contact with the movable contact point unit, the fixed contact point unit including a fixed contact point arm,
   wherein the mechanism part causes the movable contact point arm to contact the fixed contact point arm due to a load of the movable contact point spring and the back spring when the magnetic contactor is in the OFF state and causes the movable contact point arm to not contact the fixed contact point arm by distancing the movable contact point arm from the fixed contact point arm due to downward movement of the movable contact point unit when the magnetic contactor is in the ON state.

2. The motor starter module of claim 1, wherein:
   the movable contact point case physically connects the motor starter module to the magnetic contactor; and
   the fixed contact point case is physically coupled to the upper case.

3. The motor starter module of claim 1, wherein:
   the upper case includes at least one groove for coupling to the fixed contact point case; and
   the fixed contact point case includes at least one hook part for physically coupling to the upper case.

4. The motor starter module of claim 1, wherein:
   the fixed contact point arm is connected to the PCB substrate via a wire and is configured to transmit an electric signal to the PCB substrate according to operation of the magnetic contactor; and
   the PCB substrate is further configured to control the magnetic contactor based on the transmitted electric signal.

* * * * *